United States Patent [19]
Bruinshorst et al.

[11] 3,781,697
[45] Dec. 25, 1973

[54] FILTER FOR USE IN A CARRIER-WAVE MEASURING SYSTEM

[75] Inventors: Berend Theodorus Jan Bruinshorst; Theodorus Jozef Van Kessel, both of Emmasingel, Eindhoven, Netherlands

[73] Assignee: U.S. Philips Corporation, New York, N.Y.

[22] Filed: May 2, 1972

[21] Appl. No.: 249,539

[30] Foreign Application Priority Data
May 13, 1971 Netherlands .................... 7106554

[52] U.S. Cl. ................................ 328/167, 330/51
[51] Int. Cl. ............................................. H03k 5/00
[58] Field of Search .................... 328/127, 151, 142, 328/167; 333/70 A; 330/51, 69

[56] References Cited
UNITED STATES PATENTS

| | | | |
|---|---|---|---|
| 3,026,480 | 3/1962 | Usher | 328/127 |
| 3,369,186 | 2/1968 | Lejon | 330/51 |
| 3,433,936 | 3/1969 | Blanke | 333/70 A |
| 3,465,276 | 9/1969 | Silva | 328/142 |
| 3,530,389 | 9/1970 | Gormky | 330/1 A |
| 3,562,659 | 2/1971 | Kulas | 330/51 |
| 3,566,282 | 2/1971 | Lauher | 328/127 |
| 3,566,292 | 2/1971 | Nercessian | 330/51 |
| 3,581,224 | 5/1971 | Nercessian | 330/51 |
| 3,613,020 | 10/1971 | McBride | 330/1 A |

OTHER PUBLICATIONS
Philbrick/Nexus Research Applications Manual for Op Amps pages 68, 69, 72–77, 90, 96, 98, 102 Aug. 1969

*Primary Examiner*—John W. Huckert
*Assistant Examiner*—Ro E. Hart
*Attorney*—Frank R. Trifari

[57] ABSTRACT

For servo systems and measuring systems which use a carrier wave for the measuring information an accurately adjustable bandwidth around the carrier frequency is obtainable by connecting switches synchronous with the carrier wave together with filter networks in the negative-feedback loop of an operational amplifier.

This enables small carrier measuring voltages to be amplified with a given bandwidth.

By providing an additional low-frequency negative-feedback loop across the filter the filter can be made insensitive to direct voltages and low frequencies with respect to the frequency band around the carrier wave.

5 Claims, 4 Drawing Figures

FILTER FOR USE IN A CARRIER-WAVE MEASURING SYSTEM

The invention relates to a filter for use in an amplitude-modulated carrier-wave measuring system for reducing disturbing modulation of the carrier amplitude, which filter comprises an input circuit to which the carrier signal to be filtered is applied, filter networks and switches which are switched synchronously and in phase with the carrier frequency.

Physical quantities are frequently measured by means of measuring transducers which convert the quantity into an electric signal. This electric signal may contain various disturbing components which render the measurement inaccurate.

In transducers which use a direct voltage and deliver only small voltages or currents the influence of thermal voltages and their drifts due to changes in temperature are large.

To avoid these difficulties the transducers are fed with an alternating voltage if they are suited therefor. Thus, the measuring signal is an alternating voltage or an alternating current which, as the case may be in a narrow frequency range, may be amplified without being disturbed by direct voltages or low-frequency disturbance signals. Such measuring systems are generally referred to as carrier-wave measuring systems. The information to be measured may be determined by the amplitude of the alternating voltage or the alternating current.

Fields of application of these carrier-wave measuring systems are for example electronic weighing in which a strain-gauge measuring bridge is fed with an alternating voltage of, say, 50 Hz, and servo systems using a carrier frequency of, say, 50 Hz or 400 Hz.

For these practical uses it frequently is desirable for the entire measuring or regulating circuit to have a well defined bandwidth so that, for example, rapid variations of the carrier amplitude are not transmitted but certain slow variations are transmitted.

For example, a servo system must have a fixed frequency characteristic to provide appropriate control, while in electronic weighing a correct weight indication requires the removal of low-frequency amplitude modulations of the carrier wave in the servo loop by means of which the weight of the load is measured. These amplitude modulations are due to oscillations of the load on the weigh platform.

A method of achieving this bandwidth adjustment is to include band-pass filters in the measuring circuit. This method has the disadvantage that there is no relationship between the carrier frequency and the pass frequency of the filter, so that variations in these frequencies directly influence the measuring result. Furthermore, these filter are comparatively bulky in the case of low carrier frequencies, such as 50 Hz.

It is also known to demodulate the carrier wave, to filter the demodulation product and to cause the filtered signal to modulate a carrier wave having the same frequency and phase as the original carrier wave. This system has the disadvantage that disturbing properties of the modulator, the demodulator and the filter are added to the measuring result. Direct-voltage or direct-current offsets which cause zero shifts, drifts and leakage of switches and capacitors must be taken into account.

It is an object of the invention to greatly reduce these disadvantages. For this purpose a filter of the type described at the beginning of this specification is characterized in that the filter includes an amplifier the first and second input terminals of which are connected to the input circuit and the output terminals of which form the output of the filter. The filter includes a first and a second negative-feedback loop connected in parallel with one another. The first and second negative-feedback loops are identical to one another and are provided with a switch in series with a filter network which includes at least one storage element. One switch is switched in phase and the other switch in phase opposition.

The invention is based on the recognition that a modulator and a demodulator can be combined with a filter network in the negative-feedback loop of an amplifier, with the result that properties of switches, such as voltage offset or current offset, drift, leakage, switching transients and similar properties of filter components are reduced by the amplification factor of the amplifier. A further advantage of a filter according to the invention is that the input signal is amplified.

In some systems which use a servo circuit it is desirable for direct-voltage coupled circuits to be used to enable the entire regulating circuit to be controlled. Hence it may be necessary to void direct-voltage shifts of the signal. The amplifier used in the filter according to the invention may have a voltage offset and a current offset and a drift which occur in amplified form at the output of the filter and give rise to disturbances in the regulating circuit or inadmissible driving of amplifiers included in the regulating circuit. The use of a coupling capacitor does not eliminate these difficulties, for example owing to the differentiating nature together with the following circuit.

Hence an advantageous embodiment of a filter according to the invention is characterized in that a third negative-feedback loop comprising a low-frequency pass filter network is connected in parallel with the filter between the output of the amplifier and the input circuit. This enables the filter to be provided with negative feedback for direct voltage while retaining the filter properties and the amplification of signals in the carrier band, so that both applied direct voltages and direct voltages produced by the amplifier are amplified in a proportionately lesser degree.

The invention and its advantages will be described more fully with reference to embodiments shown in the accompanying diagrammatic drawings, in which.

Figure 1:
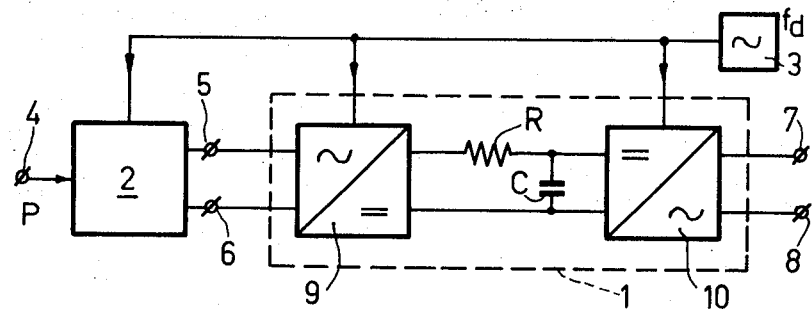
FIG. 1 shows a known demodulator-modulator system.

FIG. 1 shows a known demodulator-modulator filter circuit 1 which is associated with a carrier-wave measuring system 2 which is fed by a source 3 with an alternating voltage or an alternating current having a frequency $f_d$. A physical quantity P to be measured is symbolically applied to a terminal 4 of the measuring system 2 thereby converting it into an electric quantity which is a voltage or a current at the frequency $f_d$ of the supply source. The amplitude of the electric quantity is a measure of the value of the physical quantity. To enable this amplitude to be filtered the filter 1 is connected to terminals 5 and 6 of the measuring system 2 so that from output terminals 7 and 8 of the filter a voltage or a current may be derived which has a frequency around the carrier frequency and a bandwidth determined by the filter.

The filter 1 includes a synchronous detector 9 which converts the information offered at the terminals 5 and 6 into the low-frequency information which modulated the carrier wave. This low-frequency information is passed through a filter which is represented by a series resistor R followed by a parallel capacitor C. A modulating circuit 10 modulates the carrier wave again with the filtered low-frequency information. This known circuit has the aforementioned disadvantages.

Figure 2:
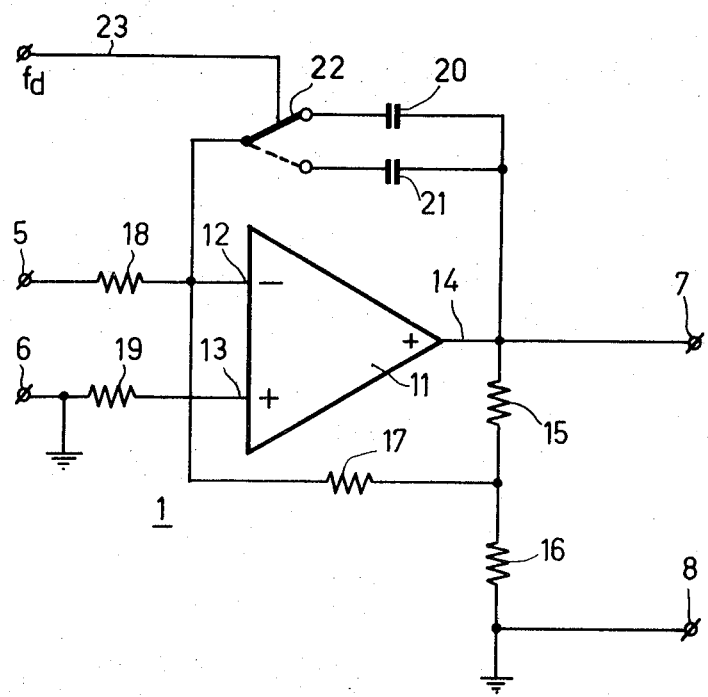
FIG. 2 shows a filter for a carrier-wave measuring system according to the invention.

FIG. 2 is an embodiment of a filter according to the invention in which similarly to the filter shown in FIG. 1 the carrier information to be filtered is applied to terminals 5 and 6 and the filtered information may be derived from terminals 7 and 8.

Input terminals 12 and 13 of an amplifier 11, in this embodiment an operational amplifier, are connected to terminals 5 and 6 via resistors 18 and 19 respectively. The terminal 6 is also connected to the output terminal 8. Any current offset of the amplifier is balanced by the resistor 19. The resistor 18 together with capacitors 20 and 21 and the amplifier 11 provided with negative-feedback resistors 15, 16 and 17 forms the filter network.

The amplification factor $A_0$ of the amplifier circuit is determined by the resistors 15 and 16 connected between an output terminal 14 of the amplifier and the common reference potential and by the resistors 17 and 18. A change-over switch 22 and the capacitors 20 and 21 are connected between the input terminal 12 and the output terminal 14. The switch 22 switches at the frequency of, and in phase with, the carrier wave, thus connecting the capacitor 20 into the amplifier negative-feedback loop during one period of the carrier wave, for example the positive period, while it connects the capacitor 21 into this loop during the other, negative carrier wave period. It will be appreciated that the filter action is produced by the components 18, 20 and 11 together with the components 15, 16 and 17 for the positive part of the carrier cycle, and by the components 18, 21 and 11 together with the components 15, 16 and 17 for the negative part thereof. Thus the capacitors 20 and 21 also serve as storage elements to retain the voltage condition of the previous switching for the next switching. As has been mentioned hereinbefore, the amplification factor of the amplifier circuit 11 together with the components 15, 16, 17 and 18 is $A_0$. The frequency characteristic of the transfer function of the entire filter for frequencies considerably lower than the switching frequency of the change-over switch may be expressed for sinusoidal signals by the formula 1, where $V_{in}$ = input voltage between terminals 5 and 6,
$V_{out}$ = output voltage between terminals 7 and 8,
$f_i$ = frequency of the input voltage,
$R_{18}$ = resistance value of the resistor 18,
$C_s$ = capacitance value of the capacitors 20 and 21, $$V_{out}/V_{in} = -A_0/1 + j 2 \pi f_1 \cdot A_0 R_{18} C_s \quad (1)$$

This filter characteristic is found to the left and to the right of the carrier frequency also and hence forms a pass band for frequencies around the carrier frequency.

The storage function of the capacitors 20 and 21 ensures that when the input voltage has a constant peak value and a frequency equal to the switching frequency and is in phase with the switching signal, the voltage across the capacitors will adjust itself to a value proportional to the mean value over one half cycle of a sinusoidal signal i.e., $2/\pi$. Thus the transfer function of the filter is:

$$V_{out}/V_{in} = -2/\pi A_0 \quad (2)$$

where now the output voltage $V_{out}$ is a square-wave voltage having the indicated peak value for the positive and negative parts, while the input voltage $V_{in}$ is the peak value of the applied sine voltage.

If the peak value is not constant but varies, for example, at a frequency $f_m$ which is lower than $f_d$ and with a modulation index $m$, the input voltage may be written: $V_{in} = V_{in-peak} ( 1 + m \cos 2 \pi f_m t ) \sin 2 \pi f_d t$ (3)

According to the equations 1 and 2 the transfer function will be:

$$V_{out-square\ wave}/V_{in-peak} = \\ -2/\pi A_0 1 + m/1 + j2\pi f_m R_{18} C_s A_0 \cos 2 \pi f_m t \quad (4)$$

When the carrier wave of the input voltage has a phase angle $\phi$ with respect to the switching signal, the factor $\cos \phi$ must be added to the equation 4.

Figure 3:
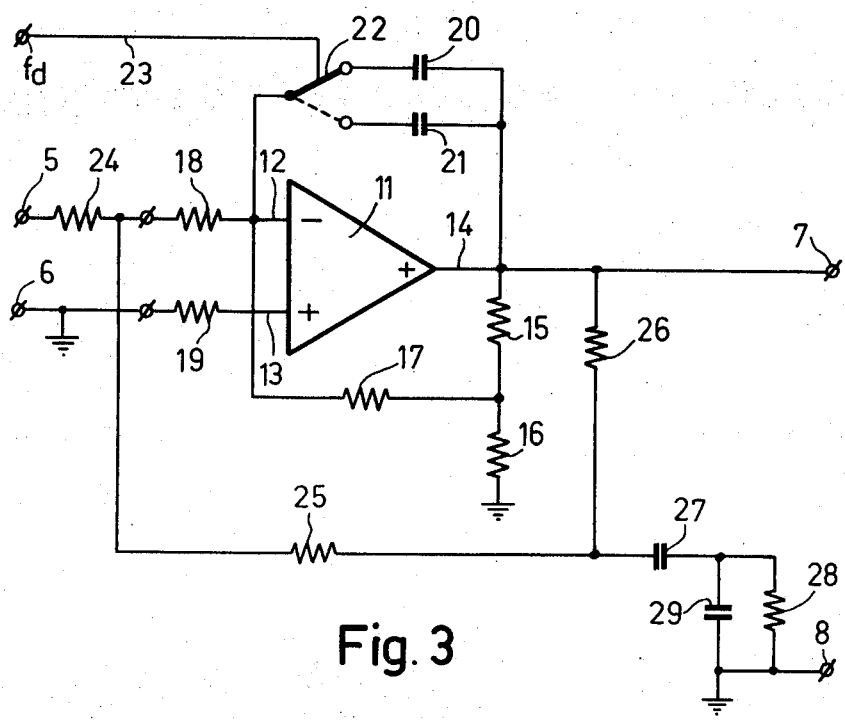
FIG. 3 shows an embodiment of a filter according to the invention provided with direct-voltage negative feedback.

FIG. 3 shows a filter according to the invention which compared with the filter shown in FIG. 2 has two additional advantageous aspects due to the use of additional negative feedback. For this purpose the entire filter shown in FIG. 2 is provided with negative feedback. As has been mentioned hereinbefore, direct voltages and low-frequency alternating voltages offered at the terminals 5 and 6 in FIG. 2 are available in amplified form at the output terminals 7 and 8 according to the equation 1. This means that direct voltage is amplified $A_0$ times. Also, the offset and drift voltages of the amplifier 11 with reference to the input terminals 12 and 13 are amplified $A_0$ times. Small input signals to be measured which are applied to the terminals 5 and 6 may be of the same order of magnitude as the said disturbing voltages. This means that the output square-wave voltage has a zero line which is displaced. This may be troublesome for further processing of the measuring signal. Furthermore the amplifier 11 may be driven by these disturbing direct voltages, affecting the measuring result.

By using negative feedback which is operative only in the low-frequency range and does not affect the pass band amplification around the carrier frequency, disturbing low-frequency input voltages and amplifier influences may be kept small.

For this purpose, in the filter shown in FIG. 3 a resistor 24 is connected between the input terminal 5 and the resistor 18, while a negative-feedback current is supplied to the input terminal 5 via a resistor 25 from a low-frequency filter network which functionally need comprise only a resistor 26 connected to the amplifier output 14 and a capacitor 27 connected to the common reference potential.

In order to prevent resonance at given low frequencies a parallel arrangement of a resistor 28 and a capacitor 29 is connected in series with the capacitor 27. The provision of such negative feedback does not influence the behaviour of the filter around the carrier frequency.

Figure 4:
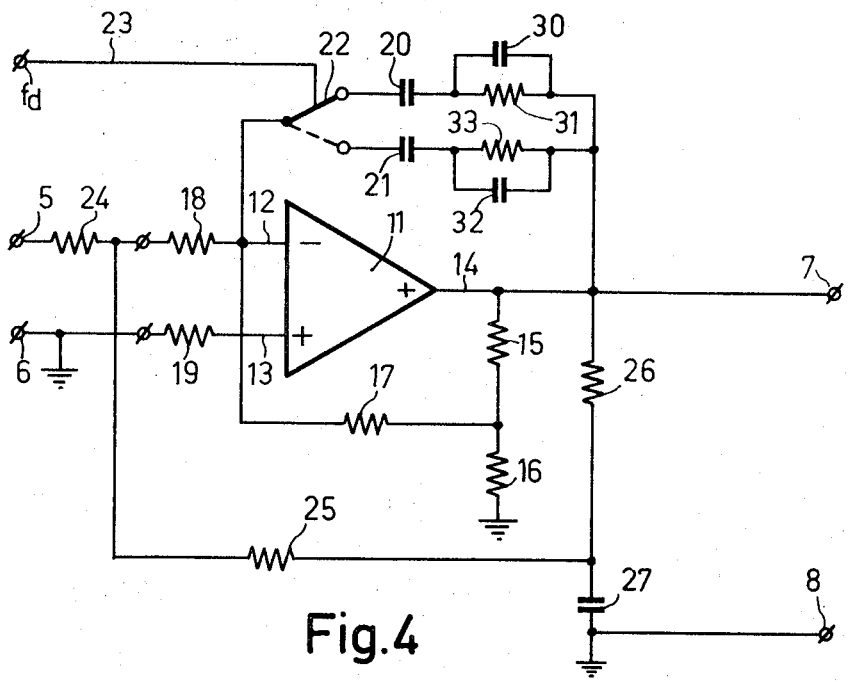
FIG. 4 shows another embodiment of a filter according to the invention provided with direct-voltage negative feedback.

FIG. 4 shows another advantageous embodiment which uses the same principle as the filter shown in FIG. 3.

The negative-feedback network comprises the resistors 24, 25 and 26 and the capacitor 27, while the parallel arrangement of a resistor 28 and a capacitor 29 as shown in FIG. 3 here is functionally included in the filter network of the two switch-controlled negative-feedback loops of the amplifier circuit. For this purpose a parallel combination of a resistor 31 and a capacitor 30 is connected in series with the series capacitor 20 and a parallel combination of a resistor 33 and a capacitor 32 is connected in series with the capacitor 21. As a result the pass band around the carrier frequency also is influenced.

The values of the various components of the filter shown in FIG. 4 may be chosen so that a a high degree of negative feedback is produced for the low-frequency range, which is determined by the resistors 24, 25 and 26 and the capacitor 27, b in a narrow band around the carrier frequency the filter has a high gain which is determined by the amplification factor $A_o$, the resistor 18 and the capacitor 20 or 21, c less gain is produced for an adjoining frequency range determined by the resistors 18 and 31 or 33 and d for frequencies more remote from the carrier frequency the pass band is determined by the resistor 18 and the capacitor 30 or 32. Thus for certain servo systems, such as in graphic recorders, an ideal control characteristic is obtained.

It should be noted that the switch 22 need not be a mechanical switch but preferably is a semiconductor switch which, for example, comprises field-effect transistors which are alternately switched.

Furthermore there may be included in the switched filter network and/or in the non-switched negative feedback loop at least one non-linear element, for example at least one zener diode, so that the transfer function of the filter will also be amplitude-dependent.

What is claimed is:

1. A filter for an amplitude-modulated carrier-wave measuring system, comprising an input circuit means for receiving an amplitude-modulated carrier-wave signal, an operational amplifier having complimentary input terminals, means connecting the complimentary input terminals of the amplifier to the input circuit means, output terminals of the operational amplifier forming the output of the filter, a first feedback loop connecting an output of the amplifier to an input thereof and comprising a storage element, a second feedback loop connecting an output of the amplifier to an input thereof and comprising a storage element identical to the storage element in the first feedback loop, the first and second feedback loops having identical filter properties, and switch means connected in series with the first and second feedback loops for alternately interrupting in phase opposition the first and second feedback loops at a frequency equal to the carrier-wave frequency.

2. Filter as claimed in claim 1, further comprising a filter network having a low-frequency pass characteristic connected as a third negative-feedback loop between the output of the amplifier and the input circuit means.

3. Filter as claimed in claim 1, further comprising an input resistor connected between the input circuit and each input terminal of the amplifier, the first and second negative-feedback loops being connected to the first input terminal of the amplifier, and a fourth negative-feedback loop connected between the output of the amplifier and an input terminal for adjusting the gain factor of the amplifier, the storage element of the first and second feedback loops each being a series capacitor.

4. Filter as claimed in claim 3, wherein each filter network comprises the series capacitor, whereby this capacitor together with the input resistor determines the frequency pass band around the carrier frequency.

5. Filter as claimed in claim 3, wherein the filter network further comprises in addition to the said series capacitor a parallel combination of a resistor and a capacitor which together with the said input resistor determines the frequency pass band around the carrier frequency.

* * * * *

PO-1050
(5/69)

UNITED STATES PATENT OFFICE
CERTIFICATE OF CORRECTION

Patent No. 3,781,697        Dated December 25, 1973

Inventor(s) BEREND THEODORUS JAN BRUINSHORST and THEODORUS JOZEF VAN KESSEL

It is certified that error appears in the above-identified patent and that said Letters Patent are hereby corrected as shown below:

IN THE SPECIFICATION

Col. 4, line 1, should read --
$$\frac{V_{out}}{V_{in}} = \frac{A_o}{1 + j\,2\pi f_1 \cdot A_o R_{18} C_s}$$ --;

Col. 4, line 17, should read :
$$-- \frac{V_{out}}{V_{in}} = \frac{-2}{\pi} A_o$$ --;

Col. 4, line 33, should read :
$$-- \frac{-2}{\pi} A_o \left[ 1 + \frac{m}{1 + j2\pi f_m R_{18} C_s A_o} \cos 2\pi f_m t \right]$$ --;

Col. 5, line 28, after "a" first occurence insert --)--;

Col. 5, line 31, after "b" insert --)--;

Col. 5, line 34, after "c" insert --)--;

UNITED STATES PATENT OFFICE
CERTIFICATE OF CORRECTION

Page 2

Patent No. 3,781,697        Dated December 25, 1973

Inventor(s) Berend Theodorus Jan Bruinshort, et al.

It is certified that error appears in the above-identified patent and that said Letters Patent are hereby corrected as shown below:

Column 5, line 36, after "d" insert -- ) --.

Signed and sealed this 21st day of May 1974.

(SEAL)
Attest:

EDWARD M. FLETCHER, JR.  
Attesting Officer

C. MARSHALL DANN  
Commissioner of Patents